Aug. 8, 1967    J. D. SCHMUNK    3,334,928
PIPE COUPLING
Filed March 10, 1965
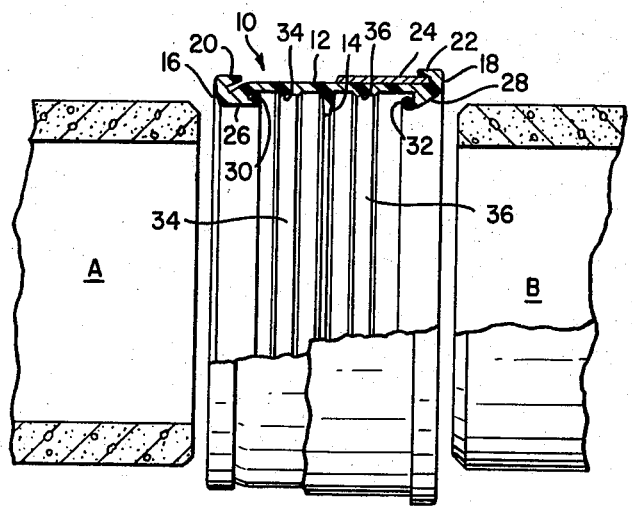
Fig. 1
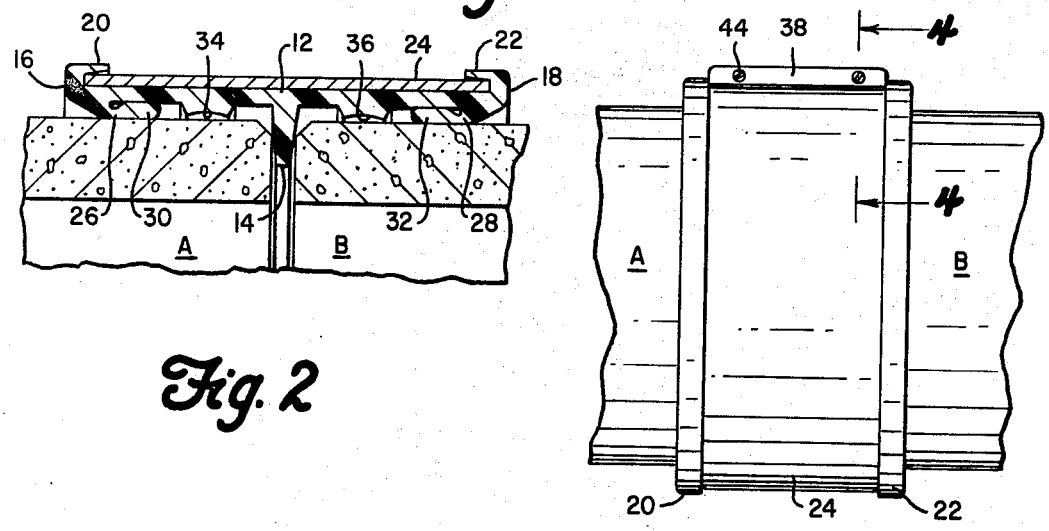
Fig. 2
Fig. 3
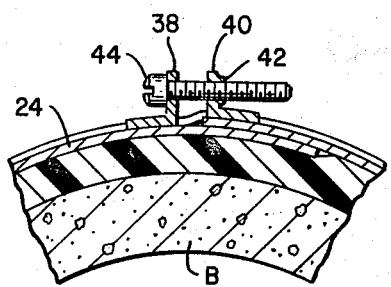
Fig. 4
INVENTOR.
JOHN D. SCHMUNK
BY
Fraser & Fraser
ATTORNEYS

United States Patent Office 3,334,928
Patented Aug. 8, 1967

3,334,928
PIPE COUPLING
John D. Schmunk, 1639 Kingswood Drive,
Findlay, Ohio 45840
Filed Mar. 10, 1965, Ser. No. 438,637
1 Claim. (Cl. 285—110)

ABSTRACT OF THE DISCLOSURE

An elastomeric coupling for plain end pipes which is secured in place by clamping band means which when in applied position rocks or actuates O-rings or beads into position for snugly engaging the exterior of the pipes.

---

This invention relates to a pipe coupling and more particularly to a coupling for connecting plain end pipes for sewers and other uses for underground installation.

An object of the invention is to produce a simple coupling of an elastomeric material which is particularly adapted to connect plain end pipes to achieve an acceptable liquid seal and to exclude the entrance of plant roots and the like.

Another object is to produce a plain end pipe coupling provided with a single clamping band which tightly embraces and contacts the adjacent pipe end so that only a relatively small area of the pipe exterior is intimately and snugly engaged, and the desired liquid seal and pipe coupling are achieved, even though the pipes are not in exact axial alignment.

A further object of the invention is to produce a coupling for plain end pipes which effects a satisfactory seal between two pipes of different sizes and shapes.

A still further object is to produce a coupling for plain end pipes which not only effects a satisfactory seal with the pipe end portions, but also has increased shear strength, thereby to militate against the damage to the coupling in case it is placed under a shear stress.

Still another object of the invention is to produce a plain end pipe coupling which is simple and inexpensive to manufacture, convenient to apply, and reliable to serve the intended purpose over an extended period of time.

These objects and advantages, as well as others, will become clearly apparent from the following detailed description of an embodiment of the invention, considered in the light of the accompanying drawings, in which:

FIGURE 1 is a fragmentary elevational view, partly in section, of a pair of abutting plain end pipes prior to their insertion into the coupling of the present invention, the coupling also being shown partly in elevation and partly in section;

FIGURE 2 is an enlarged fragmentary sectional view showing the coupling clamped in position of use and indicating the manner in which the portions of the coupling intimately engage the end portions of the adjacent pipes;

FIGURE 3 is a fragmentary plan view of the coupling applied to a pair of plain end pipes showing the exterior clamping band; and FIGURE 4 is an enlarged fragmentary sectional view taken substantially along line 4—4 of FIGURE 3.

In the illustrated embodiment of the invention, there is shown a pair of plain end pipes A and B, which are indicated as being of concrete for underground use and through which liquids, such as water, flow. The ends of the pipes are to be contiguous in the condition of use within a one-piece coupling, generally indicated by reference numeral 10. The coupling 10 comprises a generally hollow cylinder made of an elastomeric material such as, for example, neoprene. The coupling cylinder 10 includes a body portion 12 of a generally annular cross sectional configuration, having a mean thickness of the order of ⅛-inch. Intermediate the ends of the coupling body portion 12, there in an integral radially inwardly extending rib-like lip or flange 14 which typically tapers inwardly toward the innermost or free end thereof. The flange 14 is arranged to be disposed between the adjacent free ends of the pipes A and B so that the pipe ends may engage its respective side walls.

The opposed outer edges of the main body portion 12 of the coupling 10 are formed with upwardly extending flanges 16 and 18 which terminate in inwardly extending end portions 20 and 22, respectively. The end portions 20 and 22 of the flanges each taper to a thin edge and are arranged to overlay and engage the opposite marginal edges of a clamping band member 24. FIGURE 2 of the drawings shows the clamping band 24 in its operative position. In FIGURE 1 only the right hand side thereof shows the band 24 in position of use. FIGURE 1 shows on the left side that part of the coupling 10 in its free condition before the clamping band is inserted therein.

Depending from and integral with the flanges 16 and 18, there are webs 26 and 28, respectively, which are normally horizontally disposed. The innermost ends of the webs 26 and 28 are provided with O-rings or rounded beads 30 and 32, respectively. It will be noted that when the marginal edges of the clamping band 24 are positioned within the respective flanges and beneath the tapering end portions 20 and 22, the flanges 16 and 18 are flexed or rocked causing the annular beads 30 and 32 to be moved from the position shown at the left of FIGURE 1 to the position shown at the right of FIGURE 1 in which they are disposed in spaced position beneath the body portion 12.

On opposite sides of the flange 14 there are integral inwardly extending radial ribs 34 and 36 which are cylindrical and terminate in the generally concave inner surfaces. As will be seen in FIGURE 2, the ribs 34 and 36 engage the pipes only where the latter are subjected to excessive shear stress.

The clamping band 24 is preferably of stainless steel and is provided with a suitable means for tightening the same about the coupling 10. As illustrated in FIGURE 4, the ends of the clamping band 24 overlap one another, and are provided with angle brackets 38 and 40. An integral nut 42 is formed on the bracket 40 so that a threaded fastener 44 inserted through a hole in the bracket 38 may be screwed into the nut 42 for tightening the band about the coupling.

FIGURE 3 shows the use of two of such tightening means; however, it will be understood that any suitable number may be employed. Also, tightening means other than the type specifically illustrated may be utilized to achieve the desired objectives.

In assembling the ends of the pipes A and B into the coupling 10, the clamping band 24 is initially loosened so that the relative disposition of the coupling structure is similar to that illustrated on the right hand portion of FIGURE 1. More specifically, the flange 28 and the associated annular bead portion 32 is rocked downwardly to receive the plain end of its respective pipe B. The ends of the pipes A and B are then inserted into engagement with their respective annular beads 30 and 32, and the ends are then forced together so that the innermost ends of the pipes contact opposite surfaces of the flange 14. The clamping band is then tightened so that the beads 30 and 32 are caused tightly and snugly to engage the outer peripheral surface of their respective pipes and may eventually be deformed to the configuration illustrated in FIGURE 2. The supplemental ribs 34 and 36 do not normally engage the outer surface of the pipes A and B, respectively, except where one or both pipes are subjected to excessive shear stress when one or both ribs actually effect sealing engagement therewith.

In the assembled form it will be seen that extremely effective sealing is achieved between the pipes A and B by a relatively simple structure. It will be appreciated that in view of the specific construction hereinbefore described and illustrated in the drawings, adequate sealing may be achieved between two pipes having slightly different outside diameters and cross-sectional configuration. This effect is achieved by the specific construction wherein the annular beads 30 and 32 are in effect floatingly mounted and integrally connected to the coupling through the associated webs 26 and 28.

According to the patent statutes, I have explained the principles and mode of operation of my invention, and have illustrated and described what I now consider to represent its best embodiment. However, I desire to have it understood that, within the scope of the appended claims, the invention may be practiced otherwise than as specifically illustrated and described.

What I claim is:

An elastomeric coupling for plain end pipes comprising:
a hollow cylindrical body adapted to receive the end portions of adjacent pipes;
a flange integral with the inner wall of said cylindrical body and extending radially to lie between the ends of the pipes;
an annular bead on the underside of and adjacent each end of said cylindrical body;
a web resiliently connecting each bead with the respective end of said cylindrical body, said webs normally lying generally parallel to said cylindrical body with said beads in close juxtaposition to the underside thereof;
outwardly extending flanges on the outer edges of said cylindrical body respectively;
inwardly extending end portions on said outwardly extending flanges respectively providing with the outside face of said cylindrical body annular recesses, said recesses having inner and outer substantially parallel side walls and an end wall, said side walls being disposed at an angle with respect to the outer surface of said cylindrical body when said webs are in said parallel position; and
clamping band means encircling said cylindrical body with side edge portions extending into said recesses respectively thereby to rock said outwardly extending flanges to cause said inner side walls to be moved into a position substantially parallel with the outer surface of the cylindrical body portion and to cause said annular beads to be disposed in spaced relation to the underside of said cylindrical body portion for snugly engaging the outer surfaces of pipes forced axially into said cylindrical body.

References Cited

UNITED STATES PATENTS

| | | | |
|---|---|---|---|
| 2,742,305 | 4/1956 | Converse et al. | 285—236 X |
| 2,980,143 | 4/1961 | Harris | 285—373 X |
| 3,233,922 | 2/1966 | Evans | 285—236 |
| 3,249,685 | 5/1966 | Heflin | 285—236 X |

FOREIGN PATENTS

| | | |
|---|---|---|
| 1,207,151 | 8/1959 | France. |
| 831,533 | 2/1952 | Germany. |
| 925,743 | 3/1955 | Germany. |
| 1,078,200 | 3/1960 | Germany. |

CARL W. TOMLIN, *Primary Examiner.*

THOMAS F. CALLAGHAN, *Examiner.*